April 11, 1950      F. N. STOVER      2,503,521

TRANSMISSION MECHANISM

Filed June 26, 1946      2 Sheets-Sheet 1

Inventor:
Fred N. Stover

By William E. Hall
Attorney.

April 11, 1950      F. N. STOVER      2,503,521

TRANSMISSION MECHANISM

Filed June 26, 1946      2 Sheets-Sheet 2

Inventor:
Fred N. Stover
By William B. Hall
Attorney.

Patented Apr. 11, 1950

2,503,521

UNITED STATES PATENT OFFICE 2,503,521

TRANSMISSION MECHANISM

Fred N. Stover, Los Angeles, Calif.

Application June 26, 1946, Serial No. 679,476

11 Claims. (Cl. 74—54)

My invention relates to transmission mechanism and particularly to a mechanism for converting rotary motion to reciprocatory or oscillatory movement.

One object of the invention is to provide a transmission of the character referred to which is adapted to impart oscillatory movement to one or to a pair of arms and to reciprocate a saw, cutter blade, file, or other tool, carried by the pair of arms.

Another object is to provide a transmission mechanism which includes a pair of eccentrics or cams arranged for unitary rotation, a pair of slidable plungers operated by the eccentrics, and each pivotally connected at spaced points to an arm, rotation of the cams acting through the plungers to oscillate the arm to adapt the arm to perform various functions, depending upon the device or machine in which the mechanism is incorporated.

Another object is to provide a transmission mechanism in which the eccentrics or cams are adapted to be adjusted angularly with respect to each other whereby to vary the amplitude of oscillation imparted to the arm or arms and the reciprocative stroke of the part connected between the arms at their outer ends, and also to vary with certain adjustment the speed of successive strokes.

Another object is to provide a transmission mechanism which is adapted to simultaneously reciprocate a saw, or similar cutting tool, and impart a slight transverse reciprocation thereto, so that a knifing or chopping action is produced, and this is especially desirable when the saw is to be used for cutting meat and other heavy objects.

Another object is to provide a transmission mechanism of the type indicated which is of comparatively simple construction, economical to manufacture, efficient and reliable in operation.

Another object is to provide a transmission mechanism of the character specified, which may be readily and advantageously built into various types of machines or apparatus, such as rug conditioners, vacuum cleaners, floor washers, waxers, sanders and polishers, mowers, jig and hack saws, filing machines, and other equipment in which a reciprocating or oscillating motion is required.

Further objects of the invention are set forth in the following specification, which describes a preferred embodiment of the transmission mechanism, by way of example, as illustrated by the accompanying drawings. In the drawings.

Figure 1:
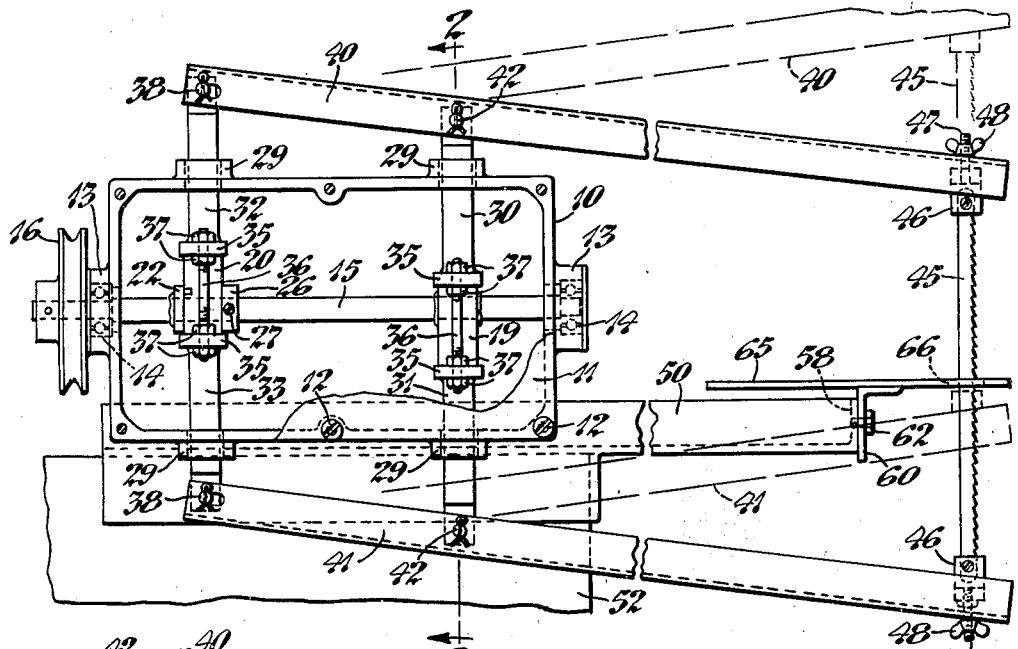
Fig. 1 is a side elevational view of my improved transmission mechanism, showing it applied to use in operating a hack-saw.
Figure 2:
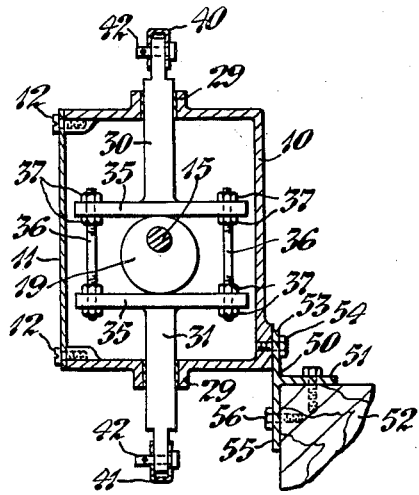
Fig. 2 is a cross-sectional view through the mechanism, taken on line 2—2 of Fig. 1.

Referring to the drawings in detail, my improved transmission mechanism comprises a rectangular box-like housing 10 having an open side, which may be normally closed by a removable cover 11 attached thereto by screws 12. The end walls of the housing 10 are provided with bearing bosses 13 in which are held ball bearings 14 for rotatably supporting a cam shaft 15. The shaft 15 projects outwardly beyond one bearing 14 to receive a pulley 16, which is secured thereto and adapted to be driven from a suitable prime mover, such as an electric motor, not herein shown.

Figures 4, 5:
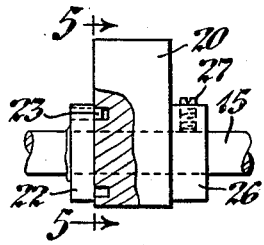
Fig. 4 is a part-sectional side elevational view of the adjusting cam.
Fig. 5 is a cross-sectional view, taken on line 5—5 of Fig. 4.

Carried by the cam shaft 15, within the housing 10, are spaced cams or eccentrics 19 and 20. The cam 19 is fixedly secured to the shaft 15, as by welding, while the cam 20 is adapted to be adjusted angularly with respect to the cam 19. As shown in Fig. 4, an annular element 22 is welded to the cam shaft 15 and is provided with a pin 23, which projects from one of its end faces. The pin 23 is adapted to enter any one of several angularly related holes 25 provided in the face of the cam 20 (see Fig. 5). The cam 20 is maintained in abutting relation to the element 22 by means of a collar 26 secured to the shaft 15 by means of a set-screw 27.

The housing 10 is provided in its upper and lower sides with bearings 29 in which upper and lower slide members or plungers 30, 31 and 32, 33 are adapted to slide vertically. Each plunger is provided at its inner end with a follower-plate 35, which rests against the edge of the cam 19 or 20. The follower-plates 35 of each pair of plungers are operatively connected together by means of threaded spacer rods 36 and nuts 37. It will be apparent from the above that when the cams 19 and 20 are rotated the pairs of plungers 30, 31 and 32, 33 will be reciprocated in a vertical direction. The outer ends of the plungers 32 and 33 are pivotally connected to the rearward ends of substantially horizontally extending arms 40 and 41, respectively, by means of pins 38. The outer ends of the plungers 30 and 31 are similarly connected to the arms 40 and 41 at a point forwardly of the pins 38 by means of pivot pins 42. As shown, the pins 38 extend through elongated holes in the arms 40 and 41 to compensate for the varying distance between the pivot connections of the arms to the plungers 30 and 31. The arms 40 and 41 may be channel shape in cross-section to adapt their sides to straddle the ends of the plungers and to provide strength and rigidity.

Figure 3:
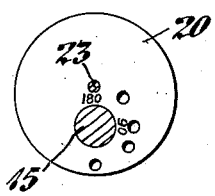
Fig. 3 is a front elevational view of the work-supporting table and illustrating the means for adjusting the angularity thereof.

The transmission mechanism is herein illustrated, by way of example, as applied to use in reciprocating a saw blade 45, and to obtain the stroke necessary to actuate the blade the arms 40 and 41 extend forwardly from the pivot pins 42 for a considerable distance. The ends of the saw blade 45 are held in slotted holders 46, which have threaded studs 47 extending vertically through holes adjacent the ends of the arms 40 and 41. Wing nuts 48 screwed onto the ends of the studs 47 tension the saw between the arms. The mechanism, as thus far described, may be suitably mounted in any convenient location, but I prefer to attach it to a work bench. The attaching means may consist of a beam 50 in the form of an angle-iron, the horizontal flange 51 of which may be secured to the top of the work bench 52. The housing 10 may be secured to the vertical flange 53 of the beam 50 by means of screws 54. The beam 50 may also have a depending flange 55, which may be fastened against the front side of the bench 52 by screws 56. The beam 50 extends forwardly from the bench 52 and is extended laterally in an arm 58. A strip 60 of angle-iron is pivotally mounted on a bolt 62 screwed into a hole in the arm 58, and the strip has an arcuate slot 63 through which a second bolt 64 extends to be screwed into a hole in the arm 58. The strip 60 carries a plate 65, which constitutes a work support, the plate being provided with an aperture 66 through which the saw blade 45 extends. By loosening the bolt 64, the work support 65 may be adjusted angularly in the manner illustrated in Fig. 3 for a well known purpose. My improved transmission mechanism having been described in detail, the operation thereof is explained as follows:

Assuming that it is desired to reciprocate the saw blade 45 through a relatively long stroke, the cam 20 is adjusted angularly on the cam shaft 15 to align the hole marked "180" with the pin 23, and this positions the lobe of the cam 20 at an angle of 180° with respect to the lobe of the cam 19, as shown in Figs. 1, 2, 5 and 6. It will be apparent, therefore, that when the cam shaft 15 is rotated the cams 19 and 20 will reciprocate the plungers 30, 31 and 32, 33 in opposite directions. That is to say, when the plungers 30, 31 are lowered the plungers 32, 33 will be raised (Fig. 1) and vice versa, this reciprocatory movement being continuous as long as the shaft 15 is rotated. Since the plungers are pivotally connected to the arms 40 and 41 by the pins 38 and 42, the arms are caused to oscillate in a vertical direction from the position shown by full lines to the position indicated by dash lines in Fig. 1. Consequently, the saw blade 45, held between the outer ends of the arms, is caused to move upwardly and downwardly in a substantially vertical path, and is thus actuated in a manner to adapt it to saw through an object moved horizontally on the work support 65. It is to be noted that the arms 40 and 41 are pivoted at two points, 38 and 42, and thus as the plungers are reciprocated the arms are oscillated and moved bodily in a vertical path. It may be said, therefore, that the motion imparted to the arms 40 and 41 by the plungers 30, 31 and 32, 33 and the cams 19 and 20 is both oscillatory and reciprocatory. The saw blade 45, which forms one side of a parallelogram whose other sides are formed by the plungers and arms, remains vertical and parallel to the plungers regardless of the angularity of the arms. However, due to the fact that the outer ends of the arms 40 and 41 move in an arc, the saw blade will move inwardly and outwardly, to a slight extent, during its vertical movement. The result of this combined movement is to cause the saw to function with a slight chopping action, which has been found to increase the cutting power of the saw.

Figure 6:
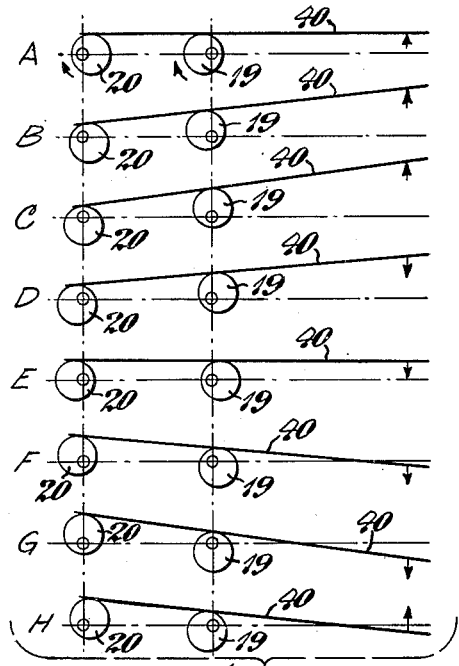
Fig. 6 is a composite diagrammatic view, graphically illustrating the positions of the main elements at various stages during one complete rotation of the cams when the latter are angularly adjusted 180° with respect to each other.
Figure 7:
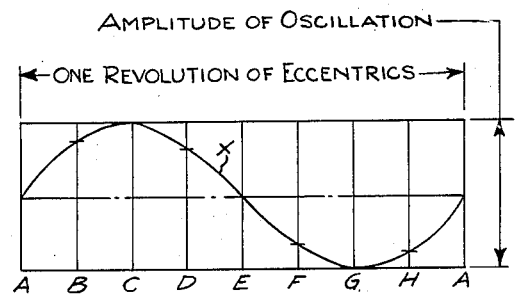
Fig. 7 is a diagram, showing the movement derived when the cams are adjusted to the position shown in Fig. 6.

The combined oscillatory and reciprocatory movement imparted to the arms 40 and 41 may be readily understood by a study of Fig. 6 in which the movement of one arm 40 through a complete cycle or rotation of the cams 19 and 20 is graphically illustrated. In this view, the arm 40 is shown as resting directly against the cams 19 and 20 for the sake of simplicity. It will be seen by reference to the diagram that during rotation of the cams 19 and 20 from the position indicated at A to that shown at B and C, the arm 40 is pivoted upwardly and at the same time is raised bodily to a slight extent. At position D, the arm 40 is being pivoted downwardly and also lowered bodily, so that when the cams 19 and 20 arrive at the position indicated at E the arm has returned to horizontal position. During rotation of the cams to the successive positions shown at F, G, and H, a reverse movement of the arm 40 is effected so that it pivots and moves downwardly and then returns to the position illustrated at A. Referring now to Fig. 7, the path through which the outer end of the arm 40 moves during this cycle is indicated by the curved line X, the degree of movement being magnified to better illustrate the principle involved. In this view, the various sequential steps of the cycle are indicated by the same characters A, B, C, etc., as in Fig. 6.

From the graph in Fig. 7 it will be seen that the amplitude between periods of revolution, designated D and F, is less than betwen H, A, and B; that is, a saw 45 moves slower in the former period than in the latter, or the elapsed time of the cutting stroke at this portion of the cycle is greater than during the latter.

Figure 8:
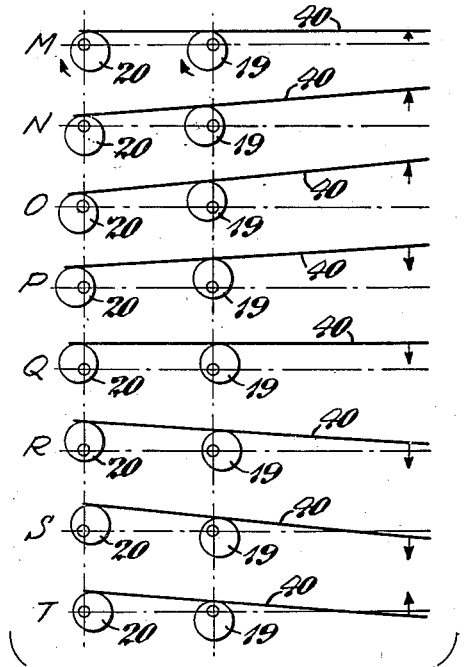
Fig. 8 is a diagram similar to Fig. 6, indicating the motion obtained when the cams are set at an angle of 90° to each other; and, Fig. 9 is a diagram similar to Fig. 7, showing the motion obtained when the cams are adjusted, as shown in Fig. 8.
Figure 9:
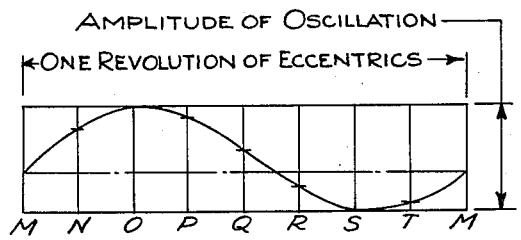

When the cam 20 is adjusted at an angle of 90° with respect to the cam 19, the arm 40 will move through the stroke illustrated in Fig. 8, the various steps of the complete cycle being graphically shown at M, N, O, P, Q, R, S, and T. Each successive step M, N, etc., represents one-eighth of a revolution of the cam-shaft 15 and by comparing the several steps it will be seen that the arm 40 is first pivoted and moved bodily upwardly and then pivoted and moved bodily downwardly. While the movement imparted to the arm 40 is similar to that imparted when the cams are adjusted, as shown in Fig. 6, the extent of oscillation of the arm 40 is reduced somewhat, as indicated in Fig. 9. Thus, by relatively adjusting the cams 19 and 20, the extent of oscillation of the arms 40 and 41, or reciprocation of the saw 45, may be regulated.

It will be observed from the above that rotation of the cams 19 and 20 causes reciprocation of the plungers 30, 31, 32, and 33, and the plungers, through their pivotal connections with the arms 40 and 41, oscillate the arms. The arms 40 and 41, in addition to oscillating, also move bodily toward and away from the axis of the cam-shaft 15, and this compound movement causes reciprocation of a saw, or other instrumentality, mounted between the arms. It will be apparent that when the cams 19 and 20 are relatively adjusted into alignment, that is, set at the same angle, the arms 40 and 41 will remain at right angles to the plungers 30, 31, 32, and 33, as the cams are rotated, and reciprocatory motion only will be imparted to the arms. In this case, the amount of reciprocation imparted to the arms will be equal to the throw of the cams. Thus it is seen that by adjusting the cam 20 with respect to the cam 19, it is possible to obtain either a reciprocatory or oscillatory motion, and the amplitude of movement may be varied in accordance with the requirements.

By varying the length of the arms 40 and 41, the degree of movement obtainable at the outer ends of the arms may be conveniently altered. It will be understood that my improved transmission mechanism may be modified in various ways to adapt it for use in a large variety of machines and appliances. For example, one of the arms 40 or 41 may be dispensed with in certain installations, and in this case compression springs are interposed between the follower-plates 35 of the remaining plungers 30, 32 or 31, 33 and the wall of the housing 10 to maintain the follower-plates in engagement with the edge of the cams. When the mechanism is to be used as the means for reciprocating saws, it is within the concept of my invention to utilize two saw blades disposed with their faces in side-by-side relation and the cutting edges of their teeth in reverse order, so that a sawing action may be obtained during both the upward and downward stroke. Since the saws will have a slight forward and rearward movement during their vertical movement, a knifing action will be produced which is particularly useful when cutting meat, such as beef quarters, into various cuts. My transmission mechanism may be applied to use with a wide variety of machines or apparatus, such as rug conditioners, vacuum cleaners, floor washers, waxers and polishers, mowers, jig and hack-saws, filing machines, and other equipment wherein a reciprocating or oscillating motion is required.

While I have herein shown and described the transmision mechanism as embodied in a preferred form of construction and applied to use in a particular manner, it is to be understood that modifications may be made in the structure thereof and in its application to use without departing from the spirit or scope of the invention. Therefore, without limiting myself in this respect, I claim:

1. A transmission mechanism, including: a pair of cams; means for rotating said cams in unison; a pair of plungers, each of said plungers having an end portion held in operative engagement with one of said cams and adapted to be moved thereby in a path normal to the axis of rotation of said cams; and an arm pivotally connected at spaced points to the other end of each of said plungers, said rotating cams imparting reciprocatory movement to said plungers and said plungers imparting oscillatory movement to said arm.

2. A transmission mechanism, including: a pair of cams; means for rotating said cams in unison; means for adjusting the relative angularity of said cams; a pair of plungers, each of said plungers having an end portion held in operative engagement with one of said cams and adapted to be moved thereby in a path normal to the axis of rotation of said cams; and an arm pivotally connected at spaced points to the other end of each of said plungers, said rotating cams being adapted upon relative adjustment to one position to reciprocate said plungers together in the same directions to impart reciprocation to said arm and adapted, upon relative adjustment to other positions, to cause variable reciprocation of said plungers whereby to impart oscillatory movement to said arm.

3. A transmission mechanism, including: a pair of cams; means for rotating said cams in unison; a pair of plungers, each of said plungers having an end portion held in operative engagement with one of said cams and adapted to be moved thereby in a path normal to the axis of rotation of said cams; an arm pivotally connected at spaced points to the other end of each of said plungers, said rotating cams imparting reciprocatory movement to said plungers and said plungers imparting oscillatory movement to said arm; and means for relatively adjusting said cams angularly to vary the oscillation of said arm.

4. A transmission mechanism, including: a shaft; a pair of cams carried by said shaft; means for rotating said shaft; a pair of plungers, each of said plungers having an end portion held in operative engagement with one of said cams and adapted to be moved thereby in a path normal to the axis of rotation of said cams; an arm pivotally connected at spaced points to the other end of each of said plungers; and means for relatively adjusting said cams on said shaft to vary the angularity between said cams and thereby adjust the oscillation of said arm.

5. A transmission mechanism, including: a housing; a shaft rotatable in said housing; a pair of cams carried by said shaft; means for rotating said shaft; a pair of plungers slidable in said housing, each of said plungers having an end portion held in operative engagement with one of said cams and adapted to be moved thereby in a path normal to the axis of said shaft; an arm pivotally connected to the other end of said plungers, said rotating cams imparting reciprocatory movement to said plungers and said plungers imparting oscillatory movement to said arm; and means for relatively adjusting said cams on said shaft to vary the angularity between said cams and thereby adjust the oscillation of said arm.

6. A transmission mechanism, including: a housing; a shaft rotatable in said housing; a first cam fixedly secured to said shaft; a second cam mounted on said shaft and adapted to rotate with said shaft, means for adjusting said second cam angularly with respect to said first cam; a pair of plungers slidable in said housing, each of said plungers having an end portion held in operative engagement with one of said cams and adapted to be moved thereby in a path normal to the axis of said shaft; and an arm pivotally connected to the other end of said plungers, said rotating cams imparting reciprocatory movement to said plungers and said plungers imparting oscillatory movement to said arm, the degree of oscillation of said arm being varied by changing the relative angularity of said cams.

7. A transmission mechanism, including: a housing; a shaft rotatable in said housing; a first cam fixedly secured to said shaft; a second cam adapted to be rotatively connected to said shaft and provided with circumferentially spaced apertures; a member fast on said shaft and provided with a lug engageable in any of said apertures to rotatively connect said second cam to said shaft, said second cam being adapted to be adjusted angularly on said shaft to align any of said apertures with said lug to vary the relative angularity of said first and second cams; means for retaining said second cam in its position of adjustment; a pair of plungers slidable in said housing, each of said plungers having an end portion held in operative engagement with one of said cams and adapted to be moved thereby in a path normal to the axis of said shaft; and an arm pivotally connected to the other end of said plungers, said rotating cams imparting reciprocatory movement to said plungers and said plungers imparting oscillatory movement to said arm, the degree of oscillation of said arm being varied by changing the relative angularity of said cams.

8. A transmission mechanism, including: a housing; a shaft rotatable in said housing; a pair of cams carried by said shaft; a pair of members slidable in said housing transversely of said shaft and each engageable with one of said cams, rotation of said cams causing reciprocation of said members; arms extending longitudinally of said shaft and each pivotally connected at one of their ends to adjacent ends of both of said members; and means for adjusting the relative angularity of said cams to effect variable reciprocation of said members, said members imparting oscillatory movement to each of said arms.

9. A transmission mechanism, including: a housing; a shaft rotatable in said housing; a pair of cams carried by said shaft; a pair of members slidable in said housing transversely of said shaft and each engageable with one of said cams, rotation of said cams causing reciprocation of said members; arms extending longitudinally of said shaft and each pivotally connected at one of their ends to adjacent ends of both of said members; means for adjusting the relative angularity of said cams to effect variable reciprocation of said members, said members imparting oscillatory movement to each of said arms; and means connected between the other end of said arms and movable therewith.

10. A transmission mechanism as defined in claim 8 in which each of said slidable members comprises a pair of axially aligned plungers engageable with opposite sides of a cam, and means connecting the plungers of each member for unitary reciprocation.

11. A transmission mechanism as defined in claim 8 in which each of said slidable members comprises a pair of axially aligned plungers, each provided with a follower-plate engageable with opposite sides of a cam, and adjustable means connecting the plungers of each member for unitary reciprocation.

FRED N. STOVER.

REFERENCES CITED

The following references are of record in the file of this patent:

UNITED STATES PATENTS

| Number | Name | Date |
|---|---|---|
| 82,585 | Baxter | Sept. 29, 1868 |
| 208,411 | Merritt | Sept. 24, 1878 |
| 226,130 | Sutton | Mar. 30, 1880 |
| 629,039 | Luiteveiler et al. | July 18, 1899 |
| 1,031,217 | Weor et al. | July 2, 1912 |
| 1,336,799 | Vaughn | Apr. 13, 1920 |
| 1,742,644 | Boice et al. | Jan. 7, 1930 |

FOREIGN PATENTS

| Number | Country | Date |
|---|---|---|
| 149,152 | Switzerland | Nov. 2, 1931 |
| 432,063 | Great Britain | July 19, 1935 |